Dec. 24, 1968                D. M. GOULD                3,417,566
                         UNDERWATER POWER SOURCE
Filed Aug. 1, 1966                                   2 Sheets-Sheet 1

INVENTOR.
DONALD GOULD
BY

ATTORNEY

Dec. 24, 1968   D. M. GOULD   3,417,566

UNDERWATER POWER SOURCE

Filed Aug. 1, 1966   2 Sheets-Sheet 2

INVENTOR.
DONALD GOULD

BY Constantine A. Michalos
ATTORNEY

United States Patent Office 3,417,566
Patented Dec. 24, 1968

3,417,566
UNDERWATER POWER SOURCE
Donald M. Gould, Glen Cove, N.Y., assignor to General Precision Systems, Inc., a corporation of Delaware
Filed Aug. 1, 1966, Ser. No. 569,363
9 Claims. (Cl. 60—95)

ABSTRACT OF THE DISCLOSURE

A portable power tool has a steam generating plant comprised of a disposable fuel cartridge producing heat through burning for generating steam in a boiler system. In addition, the power tool is provided with an energy converter such as a multiple piston swash plate receiving the steam for its operation and thereby driving a shaft or any tool that can be adapted thereon.

---

This invention relates to prime movers and, more particularly, to a light-weight, portable, compact, self-contained, general purpose power source for use as a portable power tool or propulsion unit that can operate in an oxygen-free environment.

Heretofore, the existing methods of providing power for space or underwater operation, where there is no environmental oxygen, was to utilize remote sources of power, as in underwater systems tethered to surface support equipment such as a generator, air compressor or high pressure hydraulic pump, or through the use of self-contained battery driven devices or manual tools. The disadvantages of these devices are in that the use of tethered devices decrease the mobility of the operator, require large amounts of support equipment, and suffer from large losses of efficiency as the length of the tethered line increases. Battery operated devices are limited to much smaller power outputs per pound than the herein proposed invention and in addition are limited in duration by the weight of the batteries that can be carried, and furthermore require long recharge cycles and large amounts of support equipment for recharging. The use of manual tools requires increased time to perform a given task and their applications are limited by the operator's strength and endurance. Furthermore, the heretofore used devices have higher initial and operating costs.

In one embodiment of the present invention shown, the small basic power unit can rotate a shaft. Accessory heads can be provided to convert the tool to a rotary drill, impact wrench, impact hammer or reciprocating saw.

Generally, this type of a power tool is completely self-contained, it can be hand-manipulated, it is very light, and has a power output substantially larger than its counterparts. It can operate in space or in water at depths greater than heretofore used and, in addition, has no exhaust products produced by its operation and can be configured to produce low reaction torques. By use of this power, operating time can be reduced, thus reducing the users necessity of being in outer space or underwater for unnecessarily long times, therefore, reducing the hazards related to space and underwater operation.

More specifically, the present invention provides for a space or underwater power source which is basically a small, compact, light-weight, steam-generating plant capable of producing high pressure steam in an oxygen-free environment. When this system is incorporated in a device containing an energy converter and condenser, a closed cycle system is obtainable, capable of producing large power outputs in a portable size. By utilizing a closed, condensing cycle, the power units efficiency is increased, and all exhaust products are eliminated, with the advantage of making the system's efficiency insensitive to ambient pressures. The height or underwater depth at which this system can operate is solely dependent on the ability of the seals and outer shell of the portable tool to withstand the high ambient pressures, and high and low temperatures that would be encountered.

This power source basically comprises a steam generator, an energy converter, a condenser, a water reservoir, and auxiliary pumps and valves. The steam generator comprises a boiler and a disposable fuel cartridge. Particularly, this portable power unit, by use of a fuel containing its own oxygen, represents a means for providing a power source for either space or underwater use where no oxygen is available. Therefore, this power source can be used for underwater work or for space flights where there is a lack of oxygen. The concept herein provides for a totally enclosed power unit which individually utilizes fuel capsules containing a fuel capable of burning in an oxygen-free environment.

Therefore, an object of this invention is to provide a self-contained power tool that may be used in an oxygen-free environment, having a low reaction torque with greater power output per unit weight than power tools hereinbefore designed.

Another object of this invention is to provide for a novel, portable power tool which is insensitive to ambient pressure and which is limited as to operating depth only by the mechanical strength of the enclosure of said power unit and by the ability of the seals to withstand the ambient pressure.

A further object provides a novel, portable power tool having mobility and providing its own driving means without producing exhaust products, and being capable of performing such tasks as rotating a drill, and by use of accessories to provide power for moving a wrench or impacting a hammer or reciprocating a saw.

An additional object of this invention is to provide for a power unit that can be submerged at great depths so as to be used as an ocean-bottom coring tool, diver-propulsion unit, or submarine propulsion unit.

Further objects and advantages of the present invention will be specifically pointed out or will otherwise become apparent when referring, for a better understanding of the invention, to the following description taken in conjunction with the accompanying drawings, wherein.

Figure 1:
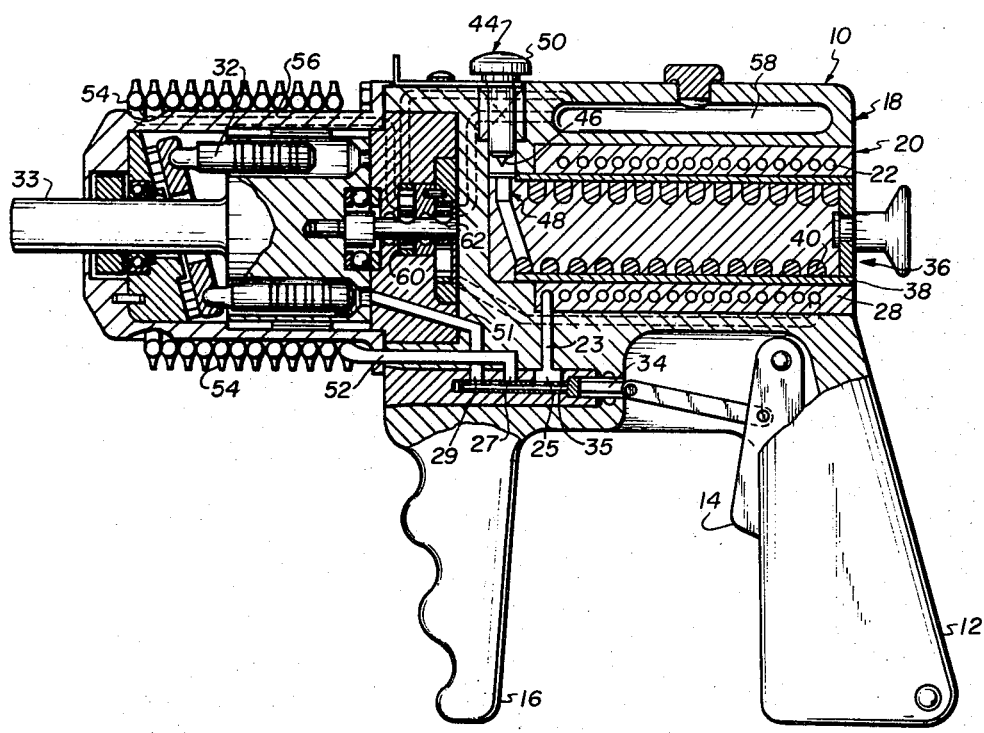
FIGURE 1 is a side sectional view of the portable power tool in accordance with a preferred embodiment of this invention.

Referring now to FIGURE 1 of the drawings, there is shown a small, compact, light-weight, steam generating plant or portable power tool 10 having a handle 12 and a throttle control 14. Forward of the handle 12 is provided a hand grip 16, so that an operator can use both hands in operating the tool.

Figure 2:
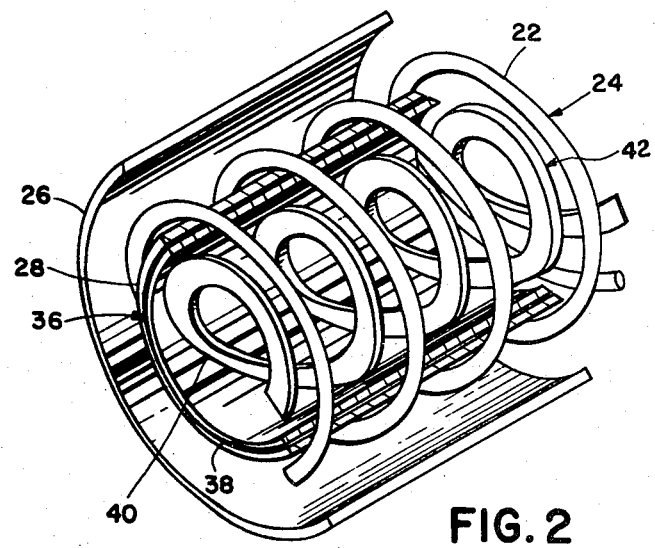
FIGURE 2 is a perspective view of a fragmentary portion of the device shown in FIGURE 1; and, FIGURE 3 is a schematic diagram illustrating the complete closed system which is incorporated in FIGURE 1.

A main casing or housing 18 contains a cylindrical steam boiler 20 composed of insulating material and in which is imbedded a continuous length of high-pressure boiler tubing 22 wound to form a cylindrical spiral or helix 24, as best shown in FIGURE 2. As shown in this figure the helix 24 can be interposed between an outer boiler shell or jacket 26 and an inner boiler shell 28.

Figure 3:
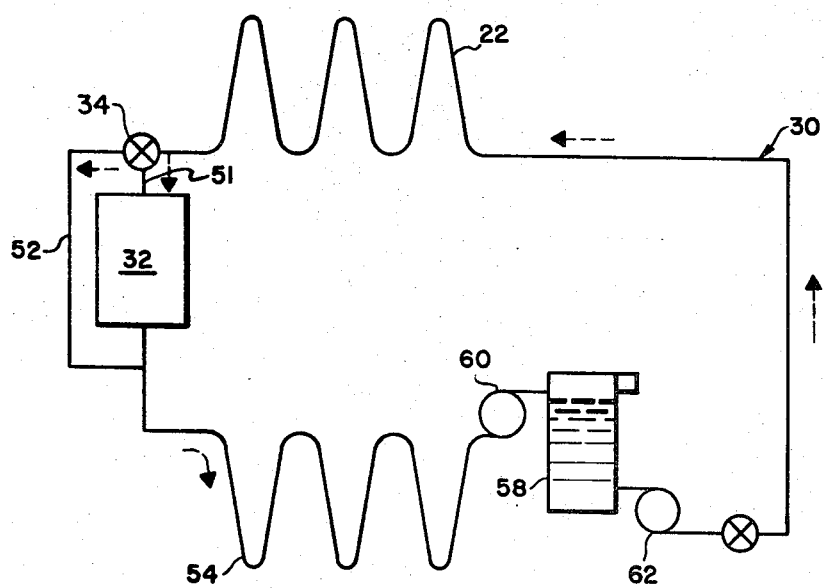

When incorporated in the system containing an energy converter and condenser, a closed system 30, as best shown in FIGURE 3, is obtained capable of producing large power outputs in a portable size. Utilizing a closed condensing type cycle would increase the efficiency of the system, eliminating all exhaust products, and make the system insensitive to ambient pressures.

The energy converter, as shown in FIGURE 1, is a multiple piston swash plate type engine 32, chosen for its adaptability to high pressure service and high power densities, for rotating a shaft 33 or for driving other tools as herein mentioned. The boiler 20 is capable of producing high pressure steam within the tubing 22 in an oxygen-free environment. The steam is directed through a bypass valve 34 by the throttle control 14 to operate the engine 32 for rotating the shaft 33.

A disposable fuel cartridge 36 includes a fuel cartridge shell or cylinder 38 which encases a fuel 40 which may be a continuous length of powder charge or thermite wound to form a helix 42 as best shown in FIGURE 2. It should be noted that the thermite is composed of iron oxide and aluminum powder. When ignited, it reacts to form molten iron and aluminum oxide in accordance with the following reaction:

$$3Fe_3O_4 + 8Al \rightarrow 4Al_2O_3 + 9Fe + 1600 \text{ B.t.u./lb.}$$

The thermite can be used in its normal powdered form or it can be sintered under high pressure into solid shapes having a density of approximately .2 lb. per cubic inch. It should be noted that additional various moldable compounds can be produced by adding fillers to the powdered ingredients.

The fuel 40 can be ignited by a spark igniting means or by an ignition means 44 comprised of a firing pin 46 which can be impelled against a charge or percussion detonator 48 by a hand-operated ignition hammer or ignition plunger 50. The fuel 40 is imbedded in the disposable fuel cartridge 36 in the configuration of the cylindrical coiled pattern or helix 42 such that the fuel 40 is adjacent to the coiled tubing 22 at all points when the fuel cartridge 36 is inserted within the boiler 20.

As brought out before, the fuel 40 contains its own oxidizing agent that is capable of burning in an oxygen-free environment. That is, thermite, when ignited at the start of the fuel path, will cause the flame to propagate along the helical path and will transfer the heat of reaction to the water within the boiler tubing 22.

The boiler 20 and cartridge 38 can be configured to produce power at various levels and time durations and be incorporated as an "on" and "off" power source for use as a space or underwater electric power generator or for a power tool as hereinbefore mentioned. That is, any combination of power output and duration can be designed into the same basic configuration.

One way the tool 10 can be designed to incorporate an "on-off" feature is by use of the throttle control 14. While the fuel 40 continues to burn, the power directed to the engine 32 can be turned "on" or "off," as desired to rotate the shaft 33. In the system illustrated, steam generated in the boiler 20 must pass through the throttle control 14. The throttle control 14 can allow any portion of the steam to bypass the energy converter or engine 32 by releasing the throttle control 14 and thus by-passing the steam from the engine 32 to stop the rotation of the drive shaft 33 even though the fuel 40 is still burning. To start the shaft 33 rotating again the throttle 14 is pressed to direct steam into the engine 32. In this manner speed control can be obtained while the fuel is continuously burning.

Another method for speed control is the use of a plurality of percussion detonators, such as the percussion detonator 48, located at predetermined distances along the fuel path. These percussion detonators can be activated by a firing pin, such as firing pin 46, located at the same locations as the percussion detonators along that helix path, to be ignited by a plunger, such as plunger 50, to produce burning of segments of fuel and thus produce an "on-off" tool, so as to operate like an electric or air drill.

More specifically, in starting the rotation of the shaft 33, using the single firing pin 46 and percussion detonator 48 as shown in FIGURE 1, steam from boiler tubing 22 is directed along a feed line 23 to a bypass valve 34.

Bypass valve 34 has an elongated tube 35 with three openings, a large inlet 25, a drive outlet 27, and a bypass outlet 29. Tube 35 can move longitudinally by pressing and releasing hand throttle 14. Even though the tube moves longitudinally, large inlet 25 constantly receives steam from feed line 23. However, drive outlet 27 and bypass 29 are longitudinally displaced so that one of these openings in one throttle position is opposite, or at least partially opposite, the inlet port of a drive conduit 51 whereas the other opening is opposite, or at least partially opposite, a bypass conduit 52. These openings, i.e., drive outlet 27 and bypass outlet 29 are so offset longitudinally that only one can be opposite or partially opposite the corresponding conduit opening. Thus, either steam is being fed through drive outlet 27 along drive conduit 51 to the engine or the steam is fed through bypass outlet 29 and bypass conduit 52 to a condenser 54. The throttle control 14 is compressed to direct steam by valve 34 through conduit 51 to the engine 32 to drive the drive shaft 33. The throttle control 14 can be released to bypass the steam directed to stop the engine 32. The steam will be directed by the valve 34 through bypass conduit 52 and into condenser tubes 54 to be reduced to water. Therefore, steam generated in the boiler 20 can be controlled by the throttle control 14 and valve 34 to operate the engine 32 or can allow any portion of the steam to bypass the engine 32 and thereby slow down or stop the engine. In this manner speed control is obtained even though the fuel 40 is continuously burning.

As best shown in FIGURE 3, when the engine 32 is in operation the exhaust steam going through the engine 32 can be directed from the engine 32 through the condenser tubing 54 through a return conduit 56 and pumped by a low pressure pump 60 into a reservoir 58. A high pressure pump 62 is used to return the feed water from the reservoir 58 to the boiler 20. It should be noted here that the only portion of the system under high pressure is within the boiler tubing 22.

In the operation of the system, referring to all the figures of the drawing, the tool 10 operates in a closed condensing type cycle, as best shown in FIGURE 3. The detonator 48, imbedded in the cartridge 36 at the beginning of the helix thermite path 42, is used to initiate the thermite reaction. Ignition of the fuel cartridge 36 will be initiated by manually impacting the ignition plunger 50 to ignite the percussion detonator 48 by means of the firing pin 46. The thermite will react and cause the flame to propagate along the fuel path, giving up its heat of reaction to the water contained within the boiler tubing 22. Steam produced in the boiler tubing 22 is fed to the energy converter or engine 32 and thence to the condensing coils or tubing 54 where it condenses and is pumped by the low pressure pump 60 back to the reservoir 48. The high pressure pump 62 returns reservoir water to the boiler 20 to be turned into steam by the burning of the fuel 40. That is, ignition of the cartridge 36 is first accomplished by impacting the ignition plunger 50 with a moderate hand pressure. The power source is assembled such that a steam outlet of the boiler 20 feeds the steam inlet of the energy converter or engine 32 and the exhaust of the energy converter is either dumped into the sea or dumped into space for non-condensing operation, or is fed to the condenser coils or tubing 54 to be converted to water and then pumped by the low pressure pump 60 into the reservoir 58 and thence to the high pressure pump 62 for return to the boiler tubes 22 to be turned into steam by the heat of reaction of the fuel 40.

After the fuel 40 is spent, a new cartridge replacement is accomplished by simply extracting the spent unit and inserting a new one. No mechanical connections are required. Replacement can be accomplished in space or underwater in zero visibility conditions. The new fuel cartridge is inserted into the boiler receptacle cylinder and then charge ignited to initiate fuel reaction for the second time. Ignition of the new fuel will result in the generation of constant steam supply and, as brought out before, the on-off and speed control are accomplished by the triggering of the throttle control 14 which operates the throttle control valve 34 which can bypass any or all of the steam produced directly to the condenser tubing 54. It should be noted that the flame, when ignited, will travel along the fuel path and produce steam in the boiler tubing 22 at a point adjacent to the flame. The steam is fed to the energy converter or engine 32 and then either dumped to the sea as brought out before for non-condensing operation or condensed and returned to the boiler tubing 22 for the condensing operation.

It should be also noted that the operating time and power output can be controlled by varying the length of the fuel cartridge, varying the cross-sectional area of the fuel path, or generally in changing the configuration of the energy converter. The mechanical output of the energy converter can be stopped instantaneously by valving the steam, such as by bypassing the converter upon command from the mechanical trigger or throttle control 14. Additionally, one cartridge can be designed with a fuel path interrupted at predetermined intervals as herein described to give preset operating time.

The basic tool shown in FIGURE 1 can produce a rotary shaft output and, as brought out before, accessory heads can be used to provide for converting the tool to a rotary drill, impact wrench, impact hammer or reciprocating saw. In any respect, the advantage of the proposed invention over the tethered, battery-operated or manual sources of power are in its greater power output per unit weight, the size which makes a lighter weight tool for a given power output, its duration being limited only by the number of fuel cartridges carried, and its ability to withstand intensive temperature and depths which are only limited by the operator's endurance and the mechanical strength of the enclosure elements. Further, this unit may be replaced at low cost and, in addition, the fuel cartridge may be replaced with no appreciable time for changing. As brought out before, alternate methods of construction would be in that the fuel path and boiler tubing can be coiled and wound in multiple concentric layers. A small duration cartridge can be arranged in the tool in the fashion of bullets in a revolver, thereby, allowing the operator to move to a new cartridge with greater ease. In addition, pelletized fuel can be used and arranged for fuel feed into a fixed flame. In addition, the steam generator and fuel cartridge can be contained in a pack with the steam fed to a small, hand-held tool by a flexible hose. Further the use of a turbine as an energy converter to drive a generator to produce electric output can be very easily provided by use of this invention.

While the present invention has been described in a preferred embodiment, it will be obvious to those skilled in the art that various modifications can be made therein within the scope of the invention, and it is intended that the appended claims cover all such modifications.

What is claimed is:

1. A portable power source capable of operating in an oxygen-free environment having fuel means operably producing energy in a fully enclosed oxygen-free environment and an energy converter in contact with said fuel means and operable thereby for transforming said energy into usable mechanical power, comprising in combination, a continuous length of fuel charge in the form of a helix having two ends, ignition means at one end of the helix for igniting said charge, a cylindrical steam boiler including insulating material for confining the energy, there being imbedded in said insulating material, a continuous length of high-pressure boiler tubing in the form of a helix juxtaposed to the helix of said charge for receiving heat therefrom and thereby producing steam energy within said boiler tubing, and, steam power means operable by said steam for converting the heat of reaction energy of the burning charge into mechanical power.

2. The structure of claim 1, wherein said steam power means is a mulitple piston swash plate engine operably receiving said steam, for converting the heat of reaction of the burning charge into mechanical power, and said boiler means further comprising a throttle control for at least partially bypassing the steam from said engine and thereby stopping said engine as desired.

3. The structure of claim 1, further comprising a housing, a handle for holding said housing in a portable position, a disposable cartridge supporting said fuel means within said housing, said fuel means being a continuous length of charge wound within said cartridge to form a helix, a source of water supply directed to said tubing for receiving heat energy from said burning charge and thereby producing steam, and said power means being a steam engine operable by the steam for producing mechanical action.

4. The structure of claim 3, further comprising a closed fluid system including the boiler tubing, condenser tubing operably receiving the spent steam from said steam engine and condensing it into water, and means for circulating said water back to said source of water supply to be reused in the system.

5. The structure of claim 4, further comprising a valve operably directing steam, produced by burning said fuel into said engine for producing mechanical action and for diverting said steam directly into said condenser tubing thereby at least partially bypassing said engine to stop said engine from operating.

6. A portable power source capable of operating in an oxygen-free environment having fuel means operably producing energy in a fully enclosed oxygen-free environment and an energy converted in contact with said fuel means and operable thereby for transforming said energy into usable mechanical power, comprising in combination, a continuous length of fuel charge in the form of a helix having two ends, ignition means located at one point on said charge for igniting said charge, a cylindrical steam boiler including a continuous length of high-pressure boiler tubing in the form of a helix juxtaposed to the helix of said charge for receiving heat therefrom and thereby producing steam energy within said boiler tubing, and, steam power means operable by said steam for converting the heat of reaction energy of the burning charge into mechanical power.

7. The structure of claim 6, wherein said fuel means is a charge including a percussion detonator means operably spark ignited for initiating the burning of said charge, said boiler forming closed circuit water system adjacent said burning charge wherein heat of reaction from the burning charge is transferred to the water thereby generating steam and a multiple piston swash plate engine operable by said steam for converting the heat of reaction into mechanical power.

8. The structure of claim 6, wherein the fuel is a continuous length of charge having two ends, percussion detonator adjacent one end of said charge, a firing pin in close proximity to said percussion detonator, and a hand operated ignition plunger operable for directing said firing pin into said detonator for initiating the burning of said charge and thereby producing a heat reaction for use by said boiler for producing power.

9. A steam boiler energy converter arrangement in a portable power source capable of operating in an oxygen-free ambient environment converting the energy produced by a heat producing fuel charge into usable mechanical power, said fuel charge comprising a continuous length of oxygen-producing ignitable material in the form of a helix having two ends, ignition means located at one point of said material for igniting said material and a retaining means to hold said material and said ignition means; said steam boiler comprising a continuous length of high-pressure boiler tubing in the form of a helix disposed for juxtaposition to said fuel charge for receiving heat therefrom and thereby producing steam energy within said boiler tubing; and, steam power means operable by said steam for converting the heat of reaction energy of the burning charge into mechanical power.

References Cited

UNITED STATES PATENTS

| | | | |
|---|---|---|---|
| 1,532,930 | 4/1925 | O'Neill | 60—50 |
| 2,965,078 | 12/1960 | Chestnut et al. | 60—39.47 XR |
| 3,109,401 | 11/1963 | Karig | 60—101 XR |
| 3,213,616 | 10/1965 | Reinke | 60—53 |
| 3,286,462 | 11/1966 | Miller | 60—39.47 |
| 3,293,851 | 12/1966 | Hulbert et al. | 60—108 XR |

CARROLL B. DORITY, JR., *Primary Examiner.*

U.S. Cl. X.R.

60—1, 37.47, 96; 122—147; 173—163